United States Patent
Loh

(10) Patent No.: US 9,818,109 B2
(45) Date of Patent: Nov. 14, 2017

(54) USER GENERATED AUTONOMOUS DIGITAL TOKEN SYSTEM

(71) Applicant: Danny Loh, Menlo Park, CA (US)

(72) Inventor: Danny Loh, Menlo Park, CA (US)

(73) Assignees: Danny Loh, Palo Alto, CA (US); Bao Tran, Palo Alto, CA (US)

( * ) Notice: Subject to any disclaimer, the term of this patent is extended or adjusted under 35 U.S.C. 154(b) by 787 days.

(21) Appl. No.: 13/966,216

(22) Filed: Aug. 13, 2013

(65) Prior Publication Data
US 2014/0164251 A1    Jun. 12, 2014

Related U.S. Application Data

(60) Provisional application No. 61/742,669, filed on Aug. 16, 2012.

(51) Int. Cl.
G06Q 40/00 (2012.01)
G06Q 20/38 (2012.01)
G06Q 20/06 (2012.01)

(52) U.S. Cl.
CPC ......... *G06Q 20/382* (2013.01); *G06Q 20/065* (2013.01)

(58) Field of Classification Search
CPC ...................................................... G06Q 40/00
USPC ........................................................... 705/38
See application file for complete search history.

(56) References Cited

U.S. PATENT DOCUMENTS

| | | | |
|---|---|---|---|
| 6,155,484 A * | 12/2000 | Sasaki | G06Q 20/06 235/379 |
| 6,269,348 B1 * | 7/2001 | Pare, Jr. | G01F 19/005 705/18 |
| 7,376,621 B1 * | 5/2008 | Ling | G06Q 20/04 705/30 |
| 7,946,502 B2 * | 5/2011 | Faith | G06K 19/07 235/380 |
| 8,602,293 B2 * | 12/2013 | Hammad | G06Q 20/12 235/375 |
| 8,606,640 B2 * | 12/2013 | Brody | G06Q 20/0655 705/26.1 |
| 8,682,802 B1 * | 3/2014 | Kannanari | G06Q 20/3274 705/64 |
| 8,763,142 B2 * | 6/2014 | McGuire | G06F 21/6263 235/380 |
| 2002/0002538 A1 * | 1/2002 | Ling | G06Q 20/04 705/41 |
| 2003/0061170 A1 * | 3/2003 | Uzo | G06Q 20/06 705/64 |
| 2005/0097060 A1 * | 5/2005 | Lee | G06Q 20/02 705/65 |

(Continued)

OTHER PUBLICATIONS

Bitcoin company—both Wikipedia p. 1-41 with reference back to 1998 when founded, wayback machine of "bitcoin.org" from 2011 p. 42-56.*

*Primary Examiner* — Kirsten Apple
(74) *Attorney, Agent, or Firm* — Tran & Associates

(57) ABSTRACT

A digital token system and methods to provide user generated digital tokens includes receiving from a plurality of users authorization to create one or more unique tokens without approval from a central authority, wherein each user who created the unique token ("creator") is the only user authorized to increase quantity of the same token-type; and rendering the quantity of each token type visible to recipients of the token.

17 Claims, 20 Drawing Sheets

(56) References Cited

U.S. PATENT DOCUMENTS

| | | | |
|---|---|---|---|
| 2005/0250538 A1* | 11/2005 | Narasimhan | G06Q 20/12 455/558 |
| 2013/0166455 A1* | 6/2013 | Feigelson | H04L 9/14 705/64 |
| 2014/0143146 A1* | 5/2014 | Passanha | G06Q 20/40 705/44 |

* cited by examiner

Token Creation and Owner Table

| MID | UID | Amount |
|---|---|---|
| 1012 | 8010 | 1530 |
| 1001 | 9022 | 20 |
| 1015 | 8001 | 120 |

This table record the token creation event associating the creator's UID, the token ID MID, and the number of tokens created.
The total number of tokens in the system is controlled only by the owner.

Balance Table

| MID | UID | Balance |
|---|---|---|
| 1001 | 9022 | 20 |
| 1012 | 8001 | 1000 |
| 1012 | 8010 | 500 |
| 1012 | 9022 | 30 |
| 1015 | 8001 | 20 |
| 1015 | 9300 | 100 |
| 1019 | 8010 | 20 |

MID: Token ID
UID: User ID
Balance: Number of MID tokens

FIG. 3

Token Creation and Owner Table

| MID | UID | Amount |
|---|---|---|
| 1012 | 8010 | 1530 |
| 1001 | 9022 | 20 |
| 1015 | 8001 | 120 |
| 1020 | 8001 | 10000 |

(1) User 8001 created 10,000 number of 1020 tokens

Balance Table

| MID | UID | Balance |
|---|---|---|
| 1001 | 9022 | 20 |
| 1012 | 8001 | 1000 |
| 1012 | 8010 | 500 |
| 1012 | 9022 | 30 |
| 1015 | 8001 | 20 |
| 1015 | 9300 | 100 |
| 1019 | 8010 | 20 |
| 1020 | 8001 | 10000 |

(2) 10,000 of 1020 tokens appears in 8001 balance

FIG. 4

Token Creation and Owner Table

| MID | UID | Amount |
|---|---|---|
| 1012 | 8010 | 1530 |
| 1001 | 9022 | 20 |
| 1015 | 8001 | 120 |
| 1020 | 8001 | 10000 |

Balance Table Before

| MID | UID | Balance |
|---|---|---|
| 1001 | 9022 | 20 |
| 1012 | 8001 | 1000 |
| 1012 | 8010 | 500 |
| 1012 | 9022 | 30 |
| 1015 | 8001 | 20 |
| 1015 | 9300 | 100 |
| 1019 | 8010 | 20 |
| 1020 | 8001 | 10000 |

Balance Table After

| MID | UID | Balance |
|---|---|---|
| 1001 | 9022 | 20 |
| 1012 | 8001 | 1000 |
| 1012 | 8010 | 500 |
| 1012 | 9022 | 20 |
| 1015 | 8001 | 20 |
| 1015 | 9300 | 100 |
| 1019 | 8010 | 20 |
| 1020 | 8001 | 9000 |
| 1020 | 8010 | 1000 |

User 8001 send user 8010
1000 1012-tokens

Total number of tokens
remain the same:

FIG. 5

Token Creation and Owner Table

| MID | UID | Amount |
|---|---|---|
| 1012 | 8010 | 1530 |
| 1001 | 9022 | 20 |
| 1015 | 8001 | 120 |
| 1020 | 8001 | 10000 |

Balance Table Before

| MID | UID | Balance |
|---|---|---|
| 1001 | 9022 | 20 |
| 1012 | 8001 | 1000 |
| 1012 | 8010 | 500 |
| 1012 | 9022 | 30 |
| 1015 | 8001 | 20 |
| 1015 | 9300 | 100 |
| 1019 | 8010 | 20 |
| 1020 | 8001 | 9000 |
| 1020 | 8010 | 1000 |

Balance Table After

| MID | UID | Balance |
|---|---|---|
| 1001 | 9022 | 20 |
| 1012 | 8001 | 1000 |
| 1012 | 8010 | 500 |
| 1012 | 9022 | 20 |
| 1015 | 8001 | 20 |
| 1015 | 9300 | 100 |
| 1019 | 8010 | 20 |
| 1020 | 8001 | 8900 |
| 1020 | 8010 | 1100 |

User 8001 send user 8010
Another 100 1012-tokens

Total number of tokens
remain the same: 10000

FIG. 6

User 8001 view : send user 8010 1000 1020-tokens

Balance Table Before

| MID | UID | Balance |
|---|---|---|
| 1001 | 9022 | 20 |
| 1012 | 8001 | 1000 |
| 1012 | 8010 | 500 |
| 1012 | 9022 | 30 |
| 1015 | 8001 | 20 |
| 1015 | 9300 | 100 |
| 1019 | 8010 | 20 |
| 1020 | 8001 | 8900 |
| 1020 | 8010 | 1100 |

Token Creation and Owner Table

| MID | UID | Amount |
|---|---|---|
| 1012 | 8010 | 1530 |
| 1001 | 9022 | 20 |
| 1015 | 8001 | 120 |
| 1020 | 8001 | 10000 |

Add Amount Table

| MID | UID | Add Amount |
|---|---|---|
| 1020 | 8001 | 100 |

Balance Table After

| MID | UID | Balance |
|---|---|---|
| 1001 | 9022 | 20 |
| 1012 | 8001 | 1000 |
| 1012 | 8010 | 500 |
| 1012 | 9022 | 20 |
| 1015 | 8001 | 20 |
| 1015 | 9300 | 100 |
| 1019 | 8010 | 20 |
| 1020 | 8001 | 9000 |
| 1020 | 8010 | 1100 |

User 8001 as owner of 1020-token creates an additional 100 1012-tokens

Total number of tokens increased to:10100

FIG. 9

Serial Number Table before

| PID (World Wide Unique ID) | MID | Amount |
|---|---|---|
| 01234567890123456789012345678901 | 1020 | 200 |

New serial number is created in table associated with 100 mid-1018 tokens

Serial Number Table after

| PID (World Wide Unique ID) | MID | Amount |
|---|---|---|
| 01234567890123456789012345678901 | 1020 | 200 |
| 01233547890123457890123495978901 | 1018 | 100 |

Balance Table Before

| MID | UID | Balance |
|---|---|---|
| 1017 | 9300 | 100 |
| 1018 | 8010 | 20 |
| 1018 | 8001 | 8900 |
| 1018 | 8204 | 1000 |

Balance Table After

| MID | UID | Balance |
|---|---|---|
| 1017 | 9300 | 100 |
| 1018 | 8010 | 20 |
| 1018 | 8001 | 8900 |
| 1018 | 8204 | 900 |

FIG. 13

| mid | uid | melonName | timeStamp | threshold | total | manifesto | id |
|---|---|---|---|---|---|---|---|
| 8002 | 8101 | Spring Samples | 2013-05-18 19:08:08 | 0 | 1000000000 | One of the very original melons just for demo | 0 |
| 8003 | 8102 | Summer Samples | 2013-05-18 19:08:08 | 0 | 1000000000 | One of the very original melons just for demo | 0 |
| 8004 | 8103 | Fall Samples | 2013-05-18 19:08:08 | 0 | 1000000000 | One of the very original melons just for demo | 0 |
| 8005 | 8104 | Winter Samples | 2013-05-18 19:08:08 | 0 | 1000000000 | One of the very original melons just for demo | 0 |
| 8006 | 8101 | Bitter Samples | 2013-05-18 19:08:08 | 0 | 1000000000 | One of the very original melons just for demo | 0 |
| 8007 | 8102 | Sweet Samples | 2013-05-18 19:08:08 | 0 | 1000000000 | One of the very original melons just for demo | 0 |
| 8008 | 8103 | Sour Samples | 2013-05-18 19:08:08 | 0 | 1000000000 | One of the very original melons just for demo | 0 |
| 8009 | 8104 | Hot Samples | 2013-05-18 19:08:08 | 0 | 1000000000 | One of the very original melons just for demo | 0 |
| 8010 | 8201 | Beautiful | 2013-05-19 02:51:10 | 0 | 10 | This commemorate the use of iid | 0 |
| 8012 | 8204 | Most beautiful | 2013-05-19 02:57:37 | 0 | 100 | acdsfjasd kid kjd | 802 |
| 8013 | 8204 | Ugly | 2013-05-19 02:58:27 | 0 | 20 | Seems like it is working | 803 |
| 8014 | 8201 | Eric Dollar | 2013-05-19 06:22:11 | 0 | 8000 | test eric dollar | 809 |
| 8015 | 8204 | Celebrate Icon Done | 2013-05-24 02:06:42 | 0 | 100 | This is to commemorate the integration of icon is ... | 811 |
| 8016 | 8204 | Walk the dog | 2013-05-24 10:17:40 | 0 | 100 | Get one every time you walk the dog | 803 |
| 8017 | 8201 | Eric Promise Dollar | 2013-05-26 03:38:15 | 0 | 888 | test shakehand icon | 0 |
| 8018 | 8204 | My piano | 2013-07-05 14:57:43 | 0 | 100 | Sample. You will get one of this token for every h... | 805 |
| 8019 | 8204 | My Carbon Dollar | 2013-07-05 18:44:35 | 0 | 1000 | One gallon of gasoline | 811 |
| 8020 | 8201 | music | 2013-07-07 08:18:05 | 0 | 800 | Sample. You will get one of this token for every h... | 805 |

FIG. 17

| uid | email | password | nickName | type | ranking | setting | timeStamp |
|---|---|---|---|---|---|---|---|
| 8001 | MelonMaster1@rollingmelon.com | wintermelon | Melon Master 1 | 0 | 0 | 0 | 2013-05-18 19:08:08 |
| 8002 | MelonMaster2@rollingmelon.com | wintermelon | Melon Master 2 | 0 | 0 | 0 | 2013-05-18 19:08:08 |
| 8003 | MelonMaster3@rollingmelon.com | wintermelon | Melon Master 3 | 0 | 0 | 0 | 2013-05-18 19:08:08 |
| 8004 | MelonMaster4@rollingmelon.com | wintermelon | Melon Master 4 | 0 | 0 | 0 | 2013-05-18 19:08:08 |
| 8005 | MelonMaster5@rollingmelon.com | wintermelon | Melon Master 5 | 0 | 0 | 0 | 2013-05-18 19:08:08 |
| 8006 | MelonBank1@rollingmelon.com | wintermelon | Melon Bank 1 | 0 | 0 | 0 | 2013-05-18 19:08:08 |
| 8007 | MelonBank2@rollingmelon.com | wintermelon | Melon Bank 2 | 0 | 0 | 0 | 2013-05-18 19:08:08 |
| 8008 | MelonBank3@rollingmelon.com | wintermelon | Melon Bank 3 | 0 | 0 | 0 | 2013-05-18 19:08:08 |
| 8009 | MelonBank4@rollingmelon.com | wintermelon | Melon Bank 4 | 0 | 0 | 0 | 2013-05-18 19:08:08 |
| 8010 | MelonBank5@rollingmelon.com | wintermelon | Melon Bank 5 | 0 | 0 | 0 | 2013-05-18 19:08:08 |
| 8101 | MelonFriend1@yahoo.com | wintermelon | Melon Friend 1 | 0 | 0 | 0 | 2013-05-18 19:08:08 |
| 8102 | MelonFriend2@yahoo.com | wintermelon | Melon Friend 2 | 0 | 0 | 0 | 2013-05-18 19:08:08 |
| 8103 | MelonFriend3@yahoo.com | wintermelon | Melon Friend 3 | 0 | 0 | 0 | 2013-05-18 19:08:08 |
| 8104 | MelonFriend4@yahoo.com | wintermelon | Melon Friend 4 | 0 | 0 | 0 | 2013-05-18 19:08:08 |
| 8201 | eric@163.com | 21218CCA77804D2BA1922C33E0151105 | Eric Guo | 0 | 0 | 0 | 2013-05-18 19:08:08 |
| 8202 | danny@yahoo.com | 21218CCA77804D2BA1922C33E0151105 | Danny Loh | 0 | 0 | 0 | 2013-05-18 19:08:08 |
| 8203 | ken@yahoo.com | 21218CCA77804D2BA1922C33E0151105 | Ken Wong | 0 | 0 | 0 | 2013-05-18 19:08:08 |
| 8204 | dannyloh@hotmail.com | 21218cca77804d2ba1922c33e0151105 | Danny D Loh | 0 | 0 | 0 | 2013-05-18 19:14:35 |

FIG. 18

| tid | fromid | toid | mid | amount | note | timeStamp |
|---|---|---|---|---|---|---|
| 90 | 8101 | 8204 | 8002 | 88 | These are gifts for demos. You can start to send t... | 2013-05-18 19:14:35 |
| 91 | 8102 | 8204 | 8003 | 88 | These are gifts for demos. You can start to send t... | 2013-05-18 19:14:35 |
| 92 | 8201 | 8202 | 8014 | 88 | test test | 2013-05-19 08:22:45 |
| 93 | 8201 | 8202 | 8014 | 88 | test test | 2013-05-19 08:23:44 |
| 94 | 8204 | 8101 | 8013 | 10 | Testing | 2013-05-19 13:44:39 |
| 95 | 8204 | 8101 | 8012 | 10 | The problem | 2013-05-19 14:49:58 |
| 96 | 8201 | 8202 | 8014 | 68 | hello | 2013-05-23 17:32:18 |
| 97 | 8204 | 8102 | 8015 | 1 | The first to get this one | 2013-05-24 02:07:04 |
| 98 | 8201 | 8202 | 8017 | 99 | test new icon | 2013-05-26 03:38:52 |
| 99 | 8204 | 8101 | 8003 | 1 | Testing | 2013-07-28 15:17:51 |
| 100 | 8204 | 8101 | 8011 | 10 | This is a test for deleting melon | 2013-08-04 14:49:57 |

FIG. 19

| uid | mid | amount |
|---|---|---|
| 8101 | 8002 | 999999912 |
| 8101 | 8003 | 1 |
| 8101 | 8006 | 1000000000 |
| 8101 | 8011 | 10 |
| 8101 | 8012 | 10 |
| 8101 | 8013 | 10 |
| 8102 | 8003 | 999999912 |
| 8102 | 8007 | 1000000000 |
| 8102 | 8015 | 1 |
| 8103 | 8004 | 1000000000 |
| 8103 | 8008 | 1000000000 |
| 8104 | 8005 | 1000000000 |
| 8104 | 8009 | 1000000000 |

FIG. 21

| uid | cid |
|---|---|
| 8201 | 8101 |
| 8201 | 8202 |
| 8201 | 8203 |
| 8202 | 8101 |
| 8202 | 8201 |
| 8202 | 8203 |
| 8203 | 8101 |
| 8203 | 8201 |
| 8203 | 8202 |
| 8204 | 8101 |
| 8204 | 8102 |

FIG. 20

USER GENERATED AUTONOMOUS DIGITAL TOKEN SYSTEM

This application is a continuation of Provisional Application Ser. No. 61/742,669, filed Aug. 16, 2012, the content of which is incorporated by reference.

BACKGROUND

The instant application is related to user generated autonomous digital tokens.

The arrival of the Internet as a commercial platform is driving the need to make digital payments possible and easy. To address these concerns, various forms of electronic currency have been developed and marketed by numerous companies. For example, eCash Technologies Incorporated, of Bothell, Wash., offers a product called "eCash", which relies on encryption and digital signature technology to permit selected "eCash" banks to issue "eCash" currency to users, which may be spent on the Web sites of vendors who will accept this "eCash". These vendors may then exchange the "eCash" for traditional money through an "eCash" bank. The use of "eCash" permits micropayments, and permits users to purchase products and services on the Web without using a credit card. The "eCash" system, and other similar systems, eliminate the need to use a credit card for each on-line transaction, and permit micropayments. Such systems require that users and merchants make arrangements with authorized banks, and require both the user and the merchant to convert between real currency and electronic currency through an authorized bank. Other ecash solutions include RocketCash Corporation, of Mountain View, Calif. The RocketCash system sets up accounts for teens who do not have credit cards, and permits their parents to add money to the accounts using checks, money orders, or credit cards. InternetCash Corporation, of New York, N.Y., offers a similar product, called InternetCash™, based on pre-paid card that is purchased in pre-determined denominations from a store, and may be used at selected on-line merchants. Another electronic currency, called "Beenz", is provided by Beenz.com, Inc., of New York, N.Y. The "beenz" system permits registered users to earn "beenz" currency as an incentive for visiting particular Web sites, shopping on-line at particular Web sites, and other on-line activity. Numerous patents on electronic currency have been issued. Among these are U.S. Pat. No. 5,983,207, to Turk et al., and U.S. Pat. No. 5,671,364, to Turk, which discuss electronic currency systems based on gold or some other commodity held at a central location. U.S. Pat. No. 4,977,595, to Ohta et al., describes cryptographic techniques that may be used by a bank to issue electronic cash. Like the other systems described hereinabove, the methods described in these patents use central organizations, such as banks, to manage user accounts and to handle transactions. Additionally, since the central organization controls the issuance of the electronic currency, the vendors who accept the electronic currency have no control over the value of the electronic currency, its sale price, the terms on which it may be bought, or to whom the electronic currency is sold. For example, it is not possible using such systems for a vendor of products or services to agree with his customer on payment terms for electronic currency that will be used to purchase goods, since the customer must pay a bank or other third-party organization for the electronic currency.

U.S. Pat. No. 7,376,621 discloses methods and apparatus for conducting electronic commerce using electronic tokens are described. The electronic tokens are issued and maintained by a vendor, who also provides products and services that can be purchased or rented using the electronic tokens. The electronic tokens may be purchased from the vendor either on-line, using a credit card, or off-line, using a check, money order, purchase order, or other payment means. Because the vendor is the issuer of the electronic tokens, there is no need for transactions to be handled by a third party, such as a bank or other organization.

Bitcoin is a cryptocurrency where the creation and transfer of bitcoins is based on an open-source cryptographic protocol that is independent of any central authority. Bitcoins can be transferred through a computer or smartphone without an intermediate financial institution. The processing of Bitcoin transactions is secured by servers called bitcoin miners. These servers communicate over an internet-based network and confirm transactions by adding them to a ledger which is updated and archived periodically using peer-to-peer filesharing technology. In addition to archiving transactions, each new ledger update creates newly minted bitcoins. The number of new bitcoins created in each update is halved every 4 years until the year 2140 when this number will round down to zero. At that time no more bitcoins will be added into circulation and the total number of bitcoins will have reached a maximum of 21 million bitcoins. To accommodate this limit, each bitcoin is subdivided down to eight decimal places; forming 100 million smaller units called satoshis per bitcoin. Bitcoin is accepted in trade by merchants and individuals in many parts of the world. Although the bitcoin is promoted as a digital currency, many commentators have criticized the bitcoin's volatile exchange rate, relatively inflexible supply, high risk of loss, and minimal use in trade.

U.S. Pat. Application No. 20130166455 discloses a physical device that carries Bitcoin value and can be physically delivered in a transaction. The physical device includes a representation of the value carried by the physical device. The representation is usable to transfer the value from the physical device to a digital domain.

SUMMARY

In one aspect, a digital token system and methods to provide user generated digital tokens includes receiving from a plurality of users authorization to create one or more unique tokens without approval from a central authority, wherein each user who created the unique token ("creator") is the only user authorized to increase quantity of the same token-type; and rendering the quantity of each token type visible to recipients of the token.

Implementations of the above system can include one or more of the following. Any user can create his or her own unique tokens. The user who created the tokens is the creator of the tokens and is the only user who can increase the quantity of tokens of the same token-type. Once created, tokens cannot be destroyed, but may expire. Once created, each token is part of a set of tokens or token-type which has an identifier MID unique to the user or unique to the system. Each token-type has a defined quantity of tokens. Each user is uniquely identified by an identifier UID in the system. Each token and its token-type can have only one creator. The device can be a mobile phone, a tablet, a desktop computer, a laptop computer, computer server or any digital device. The tokens are electronic representations of quantities that exist on a centralized system, once created (i) cannot be destroyed (ii) can only be given away or exchanged in a transaction (iii) the total outstanding quantity can only be increased by the owner (iv) the total outstanding quantity may or may not be disclosed to other users. The tokens are electronic representations of quantities that exist on one or multiple devices, once created (i) cannot be destroyed (ii) can only be given away or exchanged in a transaction (iii) the total outstanding token can only be increased by the owner (iv) the total outstanding tokens may or may not be disclosed to other users. The users may elect to keep their tokens in their possession, give them to another user, or offer them to another user or multiple users. Any user can receive tokens from another user, accept or reject an offer of tokens from another user. Any user can request tokens from another user. Any user can honor or reject request of tokens from another user. The tokens can be created to represent real world objects of value including but not limited to: a) Natural resources of limited quantity such as water, air, gasoline, minerals; b) Rights to produce carbon dioxide emission, other pollutants; c) Rights to use meeting rooms within a corporation or other organization; d) Right to vote per person; e) Commercial merchant rebate credits; f) Commercial merchant pre-paid credits; g) Commercial merchant reward credits; h) Individual credits; or i) Certification of merchandise. All token creation and transactions may or may not be traced and/or recorded. Transactions may be set up to be anonymous and/or untraceable by third party. Information regarding tokens quantity, circulation, creators and owners may or may not be traceable by central server administrator and if traceable may or may not be made available to users at the discretion of the administrator. The value of token at the time of transaction can be determined by the creator, the owner, the user or combinations of the above. The value of any token or any token-type can be indirectly determined by the credibility of the creator via a system of online feedback and ratings. Each token or token-type may or may not have expiration. Expiration may or may not be declared by the owner in the manifesto during creation, and if declared, may be set by the owner to be limited or unlimited; and if limited may include the terms of limit such as expiration date or number of transactions. An expiration term may also be triggered by ownership change, such as once not owned by user A, or once owned by user A. Another expiration term may be triggered by location change, such as once client device has traveled outside of the US. The tokens may be created and uniquely associated with real world objects of value for the purpose of authentication of these objects. During authentication the associated token (s) may go through a transaction. The record and details of this transaction may be made available to users involved in this transaction and/or other users. The tokens may be instantiated into the physical form, such as paper certificates or coupons. The physical form of tokens may be claimed and converted back to digital form. Each physical form of tokens has a unique system identifier PID and can have associated token attributes including PID, and the number of tokens M. Each physical form of tokens is uniquely associated with the corresponding digital tokens. A token can only exist in either the digital form or the physical form. Digital tokens in physical form can be encoded as but not limited to a string of numbers and characters, a 1D/2D bar code, an image, and a digital certificate. When M number of digital tokens with MID are instantiated, M tokens with MID are deducted from the user account and credited to an internal system account. A worldwide unique number, PID, is generated in the system to identify with this instance. This is done to ensure that a token can only exist either in digital form or physical form. This PID can be emailed, printed on a certificate, or put in any physical form. Any user can claim this PID. Claiming the token in physical form has the effect of crediting the user account M number of X tokens from the system internal account and at the same time, expiring the PID. Digital tokens in physical form can have associated constraining attributes including but not limited to (a) specific users who can make the claim (b) Expiration attributes based on date, claiming, number of transaction, users and geography. Claiming digital tokens in physical form can be done, but not limited to, on a web site, a mobile phone, a mobile device, a camera, a scanner, point of sales device and SMS texting.

Advantages of the digital token system may include one or more of the following. The user generated and autonomous digital token system, with physical conversion method, can facilitate transactions intra or inter various environments, organizations and institutions including but not limited to individuals, households, schools, corporations and governments. Since electronic tokens are used for business transactions, the need to transmit the user's credit card number and other personal sensitive information between the user's computer and the vendor's computer for each transaction is eliminated. Thus, the method and system provide users the convenience of minimizing interactions between the user's computer (the client computer) and the vendor's computer (the server) thus reducing overhead. Furthermore, security for the user's personal sensitive information is improved. Additionally, since the electronic tokens are issued directly by the vendor of the software or other products and services on which the tokens may be spent, rather than by a bank or other centralized organization, the vendor retains control over issuing and redeeming the tokens. The vendor is able to make whatever arrangements he or she desires for payment for the tokens, including both on-line (e.g. credit card) and off-line (e.g. check, purchase order, billing) transactions. It should be noted that as used herein, a vendor includes any subsidiaries, affiliates, and other corporate entities or persons authorized by the vendor to issue tokens. The instant methods and system do not require that any payment be made using the user's credit card. Because the user need not use a credit card for his purchases, it is unnecessary for the user to have a credit card, or for the user's computer or the vendor's computer to interact over the network with a bank or other financial institution to process credit card transactions. Additionally, since orders can be handled without credit card transactions, the overhead associated with such transactions can be reduced or eliminated, permitting micropayments. Further, since small purchases are paid for in tokens, the vendor need not send out an invoice or incur other overhead involved in handling financial transactions with small purchases. A further benefit of using the vendor-issued electronic tokens of the present invention is that privacy risks are decreased. Since all purchases or business transactions are done using tokens, very little or no personal sensitive information, such as the user's credit card number, need be transmitted over communication lines, such as the Internet. Although information transmitted via the Internet may be encrypted, it is still desirable to eliminate or minimize such transmissions, since they may be intercepted and decrypted. Furthermore, since the vendor and user interact directly for the purchase and use of electronic tokens, rather than relying on a third party such as a bank, users may be selective about which vendors they are willing to trust with their private information.

BRIEF DESCRIPTION OF THE DRAWINGS

FIG. 4 shows another exemplary balance table with MID, UID and Balance columns.

FIGS. 5-6 show an exemplary updating of the balance table before and after a transaction.

FIG. 7 shows an exemplary user interface for sending token.

FIG. 9 shows an exemplary token addition.

FIG. 13 shows an exemplary process for converting from a digital token to a serial number.

FIG. 17 shows an exemplary token creation table.

FIG. 18 shows an exemplary user table.

FIG. 19 shows an exemplary ledger table.

FIG. 20 shows an exemplary address book table, while FIG. 21 shows an exemplary balance table showing the amount of tokens available for each user id UID and token type MID.

DETAILED DESCRIPTION

Figure 1:
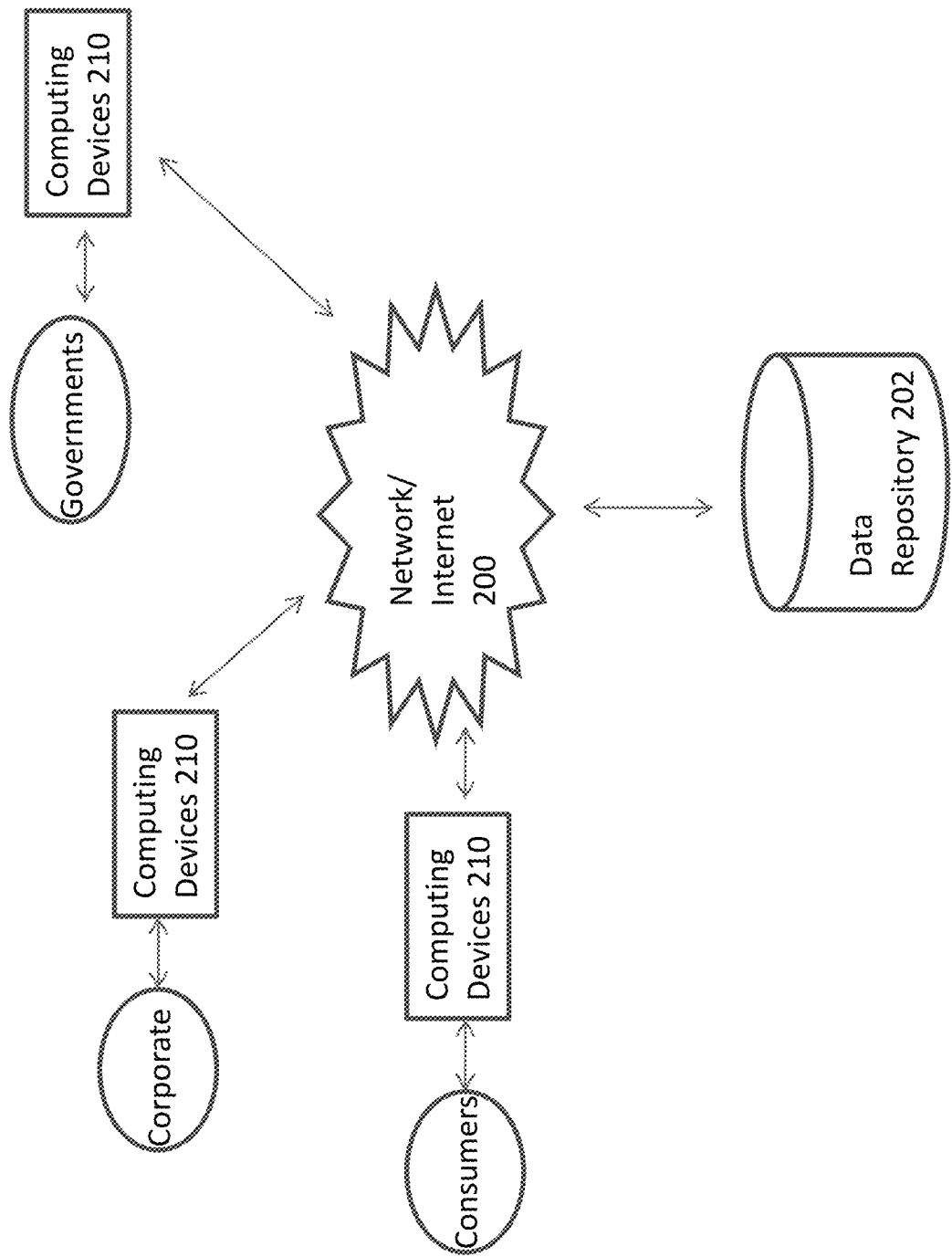
FIG. 1 shows an exemplary system with a digital token system where any user can create his or her individual supply of tokens and perform transactions with other users via the internet and other connection methods.

FIG. 1 shows an exemplary system with a digital token system where any user can create his or her individual supply of tokens and perform transactions with other users via the internet and other connection methods. The system has a data repository 202 that communicates over the Internet 200 to a plurality of computing devices 210 that in turn are used by consumers, corporations, and governments.

The digital token system of FIG. 1 uses a client server system where a centralized server or data repository 202 is connected to multiple devices 210 and the data repository 202 acts as the central synchronization point for all transactions among the different devices 210. In one embodiment, the system can be a peer to peer system where devices are connected to each other directly and transactions between the two devices require no third party involvement. The device 210 can be a mobile phone, a tablet, a desktop computer, a laptop computer, computer server or any digital device.

The system of FIG. 1 provides a user generated and autonomous digital token system, with a physical conversion method, that can facilitate transactions intra or inter various environments, organizations and institutions including but not limited to individuals, households, schools, corporations and governments. The system provides autonomous value, meaning the type of token system where the token value is not explicitly tied to something else, like Bitcoin. The association of external value to the token is external to this token system. The creation of new tokens by any users, via their existing personal devises including cell phone, laptop and desktop. The issuance of new tokens is done by and only by a toke's owner/creator. The supply of tokens is controlled by the owner/creator. Properties of tokens are that: 1) tokens cannot be duplicated or issued by anyone else other than the original creator; and 2) the total supply of tokens, and the total number of outstanding tokens (tokens not in the owner's account) are visible by all users, thus establishing that the key property, supply of the token in the system, that influence the value of the token is visible to all users. The digital token in this system can be converted into physical form while preserving the property that the total supply of the token remains the same. "any user" can the be creator of a token, as opposed to existing method that allows central authorities such as banks to issue money or token. Moreover, any user can use the token with their current personal devices such as portable computers, laptops, tablets, smart phones, among others.

Figure 2:
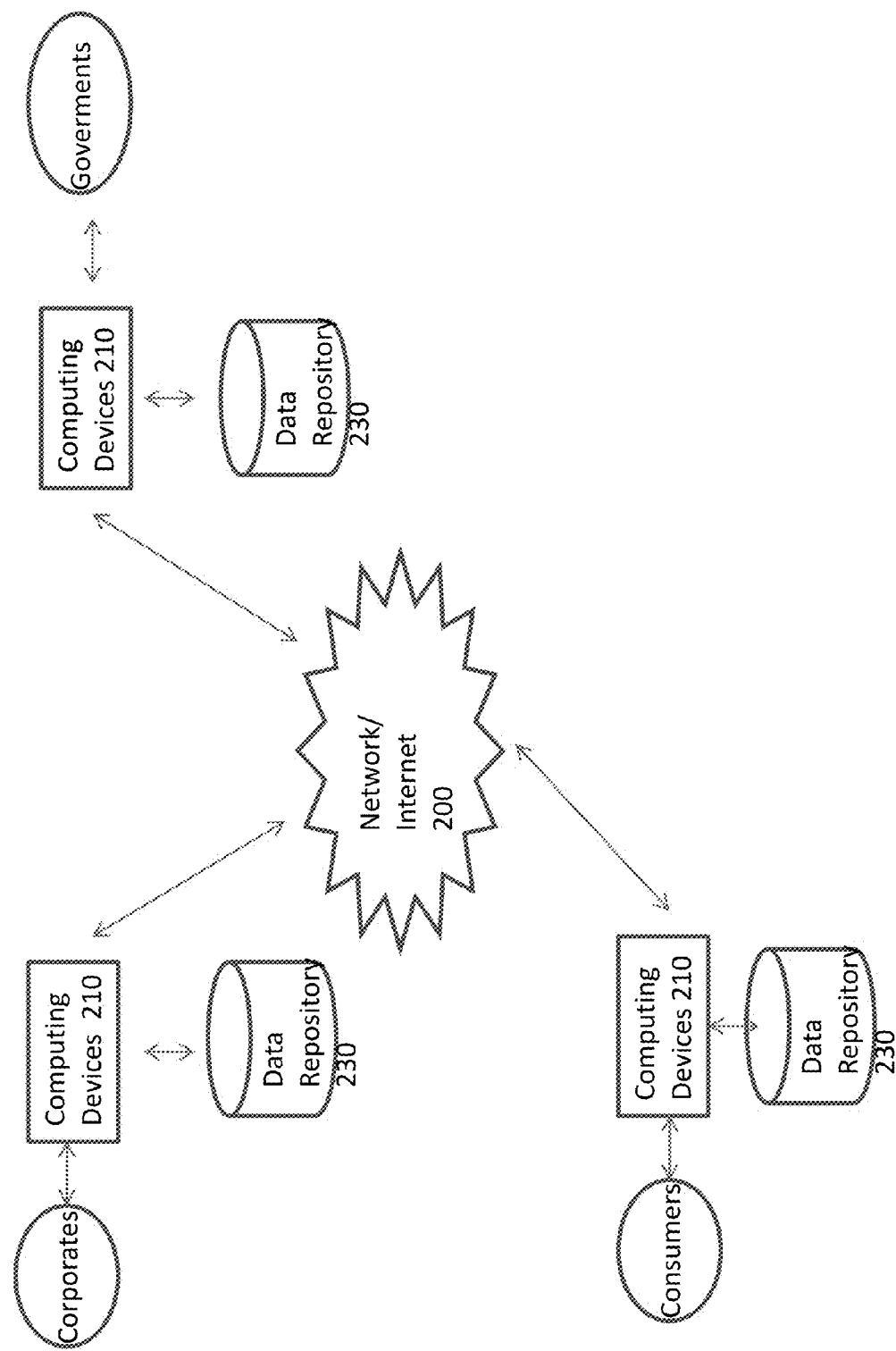
FIG. 2 shows a distributed version of FIG. 1 where each user has a separate repository.

FIG. 2 shows a digital token system using a client server system that communicates over the Internet 200 where each computing device 210 is affiliated with a data repository 230. This embodiment is a peer to peer system where devices are connected to each other directly and transactions between the two devices require no third party involvement.

In the digital token system, any user can create his or her unique tokens. The user who created the tokens is the creator of the tokens and is the only user who can increase the quantity of tokens of the same token-type. Each created set of tokens called token-type has a unique identifier MID. Each user is uniquely identified by a system wide identifier UID. Each user can create limited or unlimited tokens. The user who created the tokens is the creator of the tokens. Once a token is created new tokens of that token-type can only be created by the same creator who thereby partially controls the number of outstanding tokens. The creator may create and link a manifesto to the created tokens. The manifesto may be visible to the owner of the tokens.

Once created, tokens cannot be destroyed, but may expire. Further, once created, each token is part of a set of tokens or token-type which has an identifier MID unique to the user or unique to the system. Each token-type has a defined quantity of tokens. Each user is uniquely identified by an identifier UID in the system. Each token and its token-type can have only one creator.

In one embodiment, the tokens are electronic representations of quantities that exist on a centralized system, once created (i) cannot be destroyed (ii) can only be given away or exchanged in a transaction (iii) the total outstanding quantity can only be increased by the owner (iv) the total outstanding quantity may or may not be disclosed to other users.

In another embodiment, the tokens are electronic representations of quantities that exist on one or multiple devices, once created (i) cannot be destroyed (ii) can only be given away or exchanged in a transaction (iii) the total outstanding token can only be increased by the owner (iv) the total outstanding tokens may or may not be disclosed to other users.

Within the digital token system users may elect to keep their tokens in their possession, give them to another user, or offer them to another user or multiple users. Any user can receive tokens from another user, accept or reject an offer of tokens from another user. Any user can request tokens from another user. Any user can honor or reject request of tokens from another user. The tokens can be created to represent real world objects of value including but not limited to:

a) Natural resources of limited quantity such as water, air, gasoline, minerals.

b) Rights to produce carbon dioxide emission, other pollutants.

c) Rights to use meeting rooms within a corporation or other organization d) Right to vote per person.

e) Commercial merchant rebate credits.

f) Commercial merchant pre-paid credits.

g) Commercial merchant reward credits.

h) Individual credits.

i) Certification of merchandise.

In one embodiment, all creation and transactions may or may not be traced and/or recorded. Transactions may be set up to be anonymous and/or untraceable by third party. Information regarding tokens quantity, circulation, creators and owners may or may not be traceable by central server administrator and if traceable may or may not be made available to users at the discretion of the administrator.

The value of token at the time of transaction can be determined by the creator, the owner, the user or combinations of the above. The value of any token or any token-type can be indirectly determined by the credibility of the creator via a system of online feedback and ratings.

Each token or token-type may or may not have expiration. Expiration may or may not be declared by the owner in the manifesto during creation, and if declared, may be set by the owner to be limited or unlimited; and if limited may include the terms of limit such as expiration date or number of transactions. An expiration term may also be triggered by ownership change, such as once not owned by user A, or once owned by user A. Another expiration term may be triggered by location change, such as once client device has traveled outside of the US.

In one embodiment, tokens may be created and uniquely associated with real world objects of value for the purpose of authentication of these objects. During authentication the associated token(s) may go through a transaction. The record and details of this transaction may be made available to users involved in this transaction and/or other users.

The tokens may be instantiated into the physical form, such as paper certificates or coupons. The physical form of tokens may be claimed and converted back to digital form. Each physical form of tokens has a unique system identifier PID and can have associated token attributes including PID, and the number of tokens M. Each physical form of tokens is uniquely associated with the corresponding digital tokens. A token can only exist in either the digital form or the physical form.

Digital tokens in physical form can be encoded as but not limited to a string of numbers and characters, a 1D/2D bar code, an image, and a digital certificate.

When M number of digital tokens with MID are instantiated, M tokens with MID are deducted from the user account and credited to an internal system account. A world wide unique number, PID, is generated in the system to identify with this instance. This is done to ensure that a token can only exist either in digital form or physical form. The PID can be emailed, printed on a certificate, or put in any physical form. Any user can claim this PID. Claiming the token in physical form has the effect of crediting the user account M number of X tokens from the system internal account and at the same time, expiring the PID.

In another embodiment, digital tokens in physical form can have associated constraining attributes including but not limited to (a) specific users who can make the claim (b) Expiration attributes based on date, claiming, number of transaction, users and geography, among others.

The claiming of digital tokens in physical form can be done, but not limited to, on a web site, a mobile phone, a mobile device, a camera, a scanner, point of sales device and SMS texting. Tokens can be transacted between users. Tokens can be transferred to other users. Tokens can be offered to other users. A user can reject an offer of tokens from other users. A user can request tokens from other users. The actual outstanding quantity of a token in the system may or not may not be disclosed to other users. The associated manifesto may or may not be changed by the creator of the tokens.

Activities include creation of user accounts, creation of tokens by user, transaction of tokens from one user to another user, offer of token from one user to another, acceptance or rejection of offer between users, request of tokens between users.

Figure 3A:
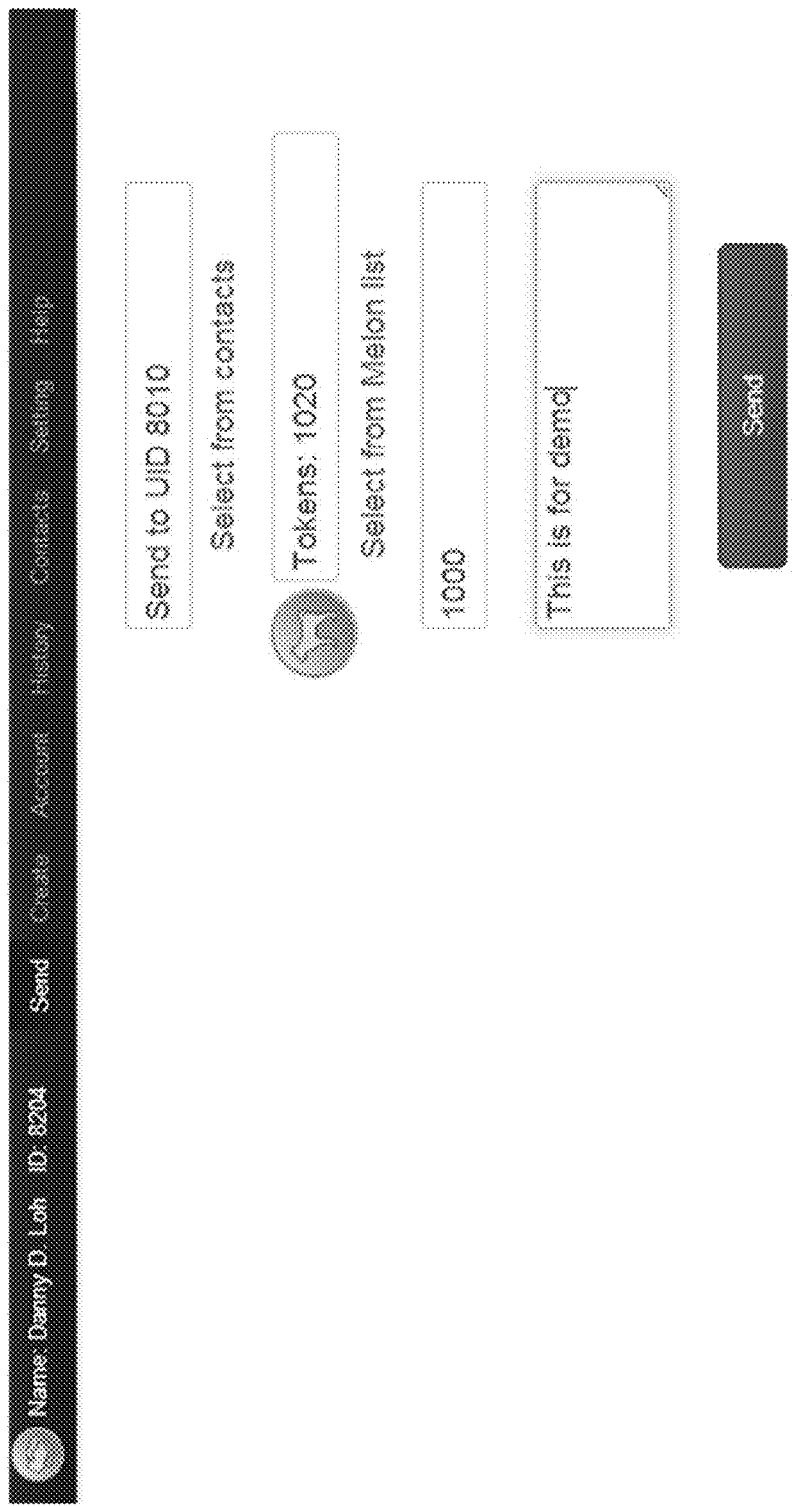
FIG. 3 shows an exemplary token balance table.

FIG. 3 shows an exemplary token balance table. In this example, a column MID stores each token identifier (ID), while a UID column stores associated user ID. A balance column stores the number of MID tokens available for use. FIG. 3 also shows an exemplary token creation and owner table. This table record the token creation event associating the creator's UID, the token ID MID, and the number of tokens created. The total number of tokens in the system is controlled only by the owner. For example, only user with MID 8010 can modify or delete tokens with MID of 1012, and the number of tokens created is 1530.

FIG. 4 shows another exemplary balance table with MID, UID and Balance columns. In this example, from the last row, user 8001 created 10,000 of tokens with MID 1020, and the balance is also 10,000.

FIGS. 5-6 show an exemplary updating of the balance table before and after a transaction. For example, in FIG. 5, before the transaction, user 8001 has a balance of 10000 tokens while user 8010 has 20 tokens. User 8001 send user 8010 1000 tokens of MID 1020, so after the transaction, user 8001 has 9000 tokens of type 1020, while user 8010 has 1000 tokens of type 1020. Meanwhile, user 8010 also has balance of 20 tokens of MID 1019 and 500 tokens of MID 1012. The token creation and owner table does not change because the tokens have been exchanged in this transaction (no new token created). The total number of tokens remains the same before and after the transaction.

Figure 8:
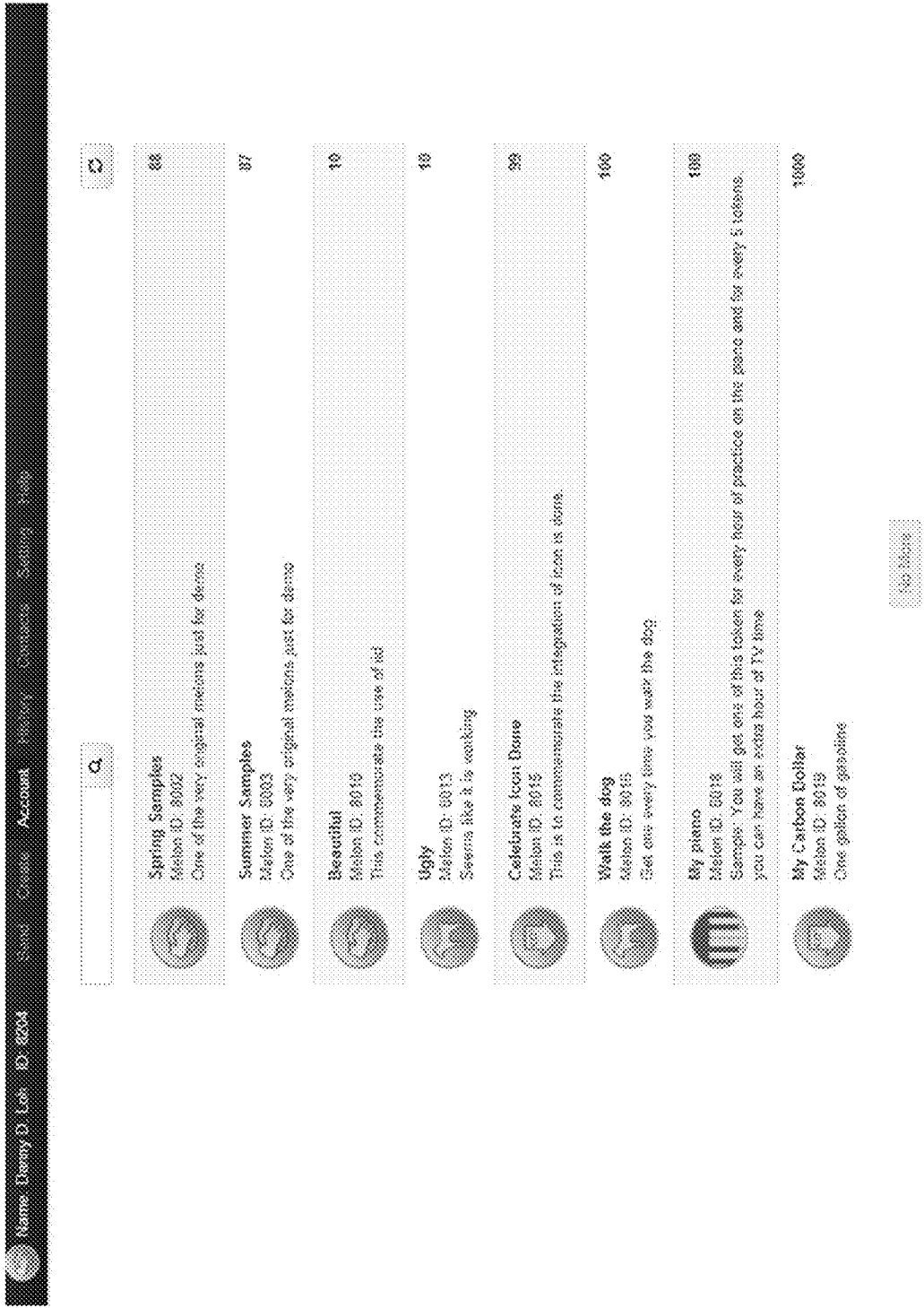
FIG. 8 shows an exemplary recipient view of tokens received from other users.

FIG. 7 shows an exemplary user interface for sending token. In this example, as viewed from User 8024's login view, User 8024 is sending user 8010 1000 of the 1020-tokens. A message may accompany the token send operation. FIG. 8 shows an exemplary recipient view of tokens received from other users.

FIG. 9 shows an exemplary token addition. In this example, user 8001 as owner of 1020-token creates an additional 100 of 1012-tokens. The Add Amount Table shows the added 100 token to the 1020 token by the user, and the balance table is updated to reflect the additional 100 tokens of type 1020. The total number of 1020 type tokens is increased to 10100.

Figure 10:
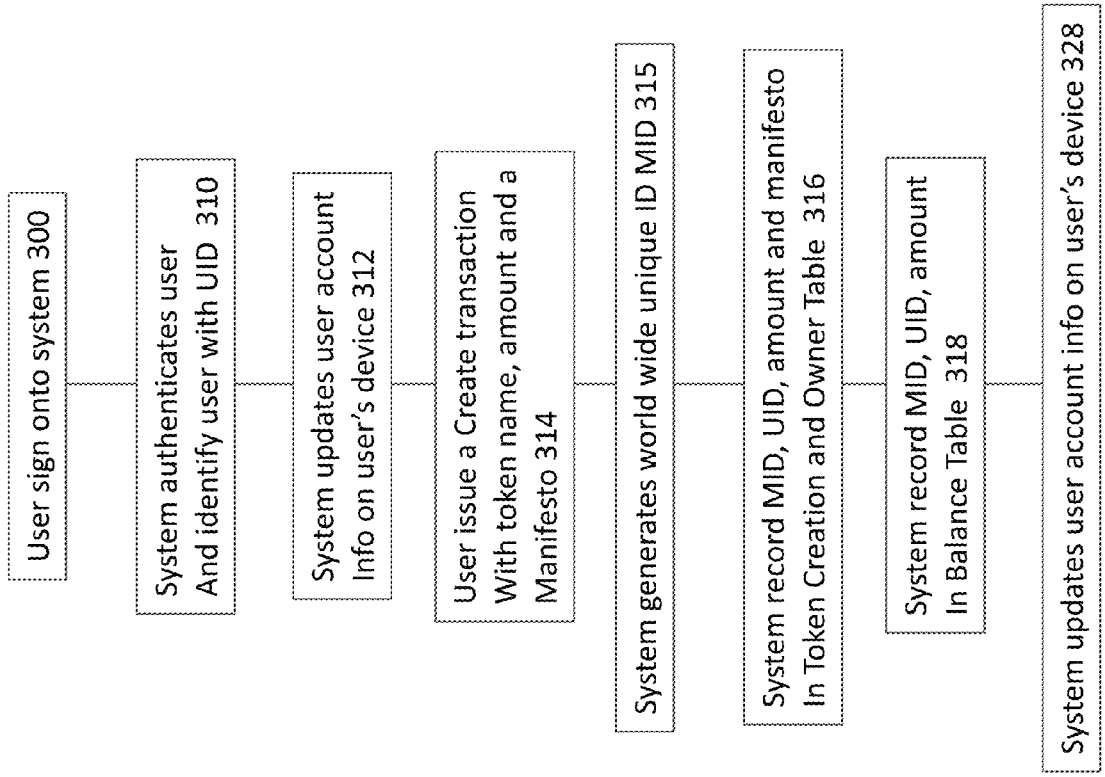
FIG. 10 shows an exemplary token creation process.

FIG. 10 shows an exemplary token creation process. In this process, a user logs into the system (300). The system authenticates and identifies the user with the UID (310). The system updates the user account information on the user's device (312). Next, the user issues a create transaction with a token name, amount, and a manifesto (314). The system in turn generates a globally unique ID (MID) (315) and then records the MID, UID, amount, and manifesto in a token creation and owner table (316). The system then records the MID, ID, and amount in a balance table (318). Finally the system updates the user account information on the user's device (328).

Figure 11:
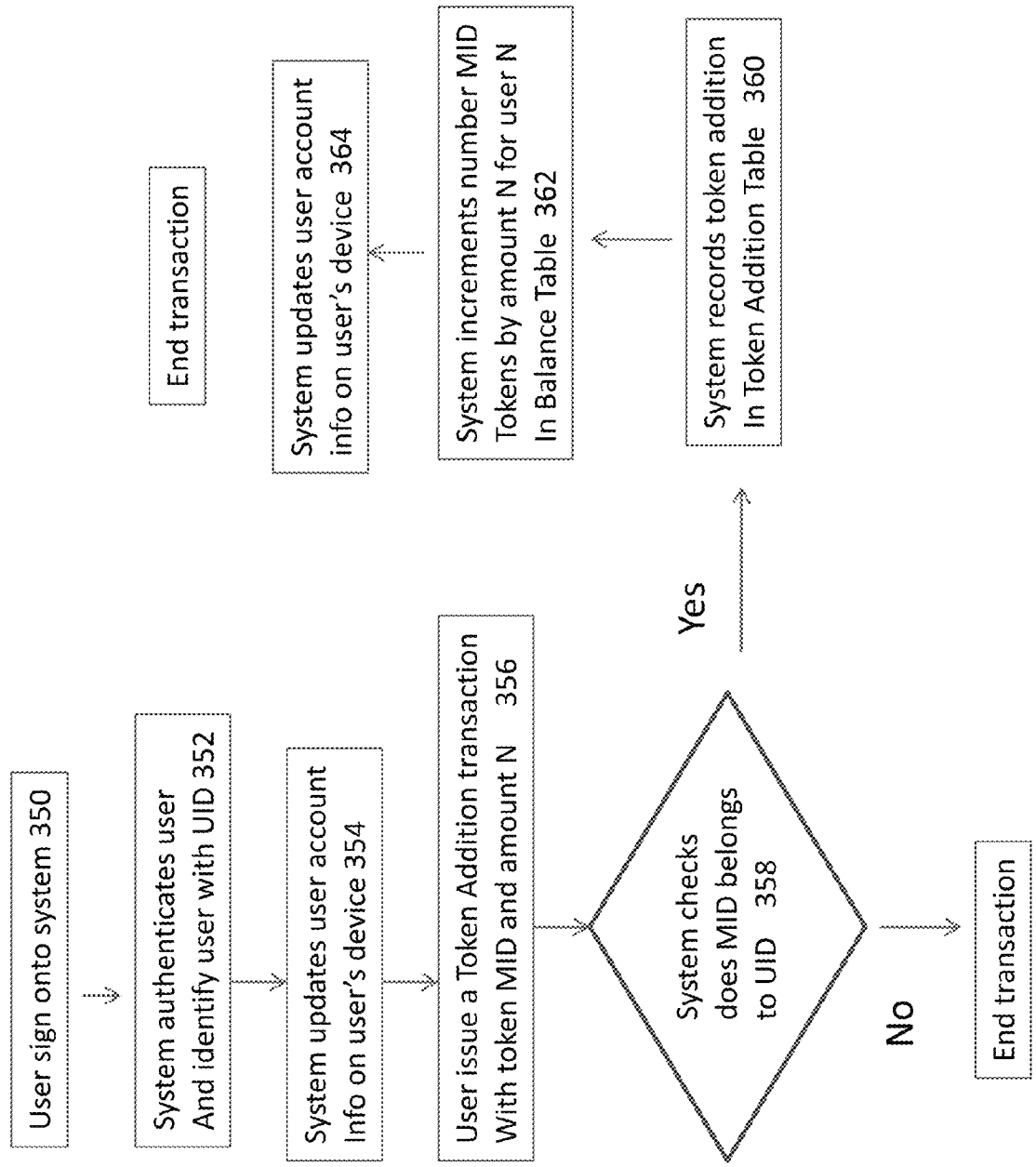
FIG. 11 shows an exemplary process to add tokens by the creator.

FIG. 11 shows an exemplary process to add tokens by the creator. First the creator or user signs onto the system (350). The system authenticates and identifies the user with a particular UID as the creator of the token (352). Next, the system updates user account information on the user's device (354). The user or creator then issues a token addition transaction with a particular token MID and amount N (356). Only tokens created by the user are allowable and thus the system checks with the creator with UID owns the MID (358). If not the request is decline. If the user UID owns the token MID, then the system records the token addition in a token addition table (360). The system increments the token with MID by the amount N for the user UID in the balance table (362). The system then updates the user account information on the user's device (364) and exits.

Figure 12:
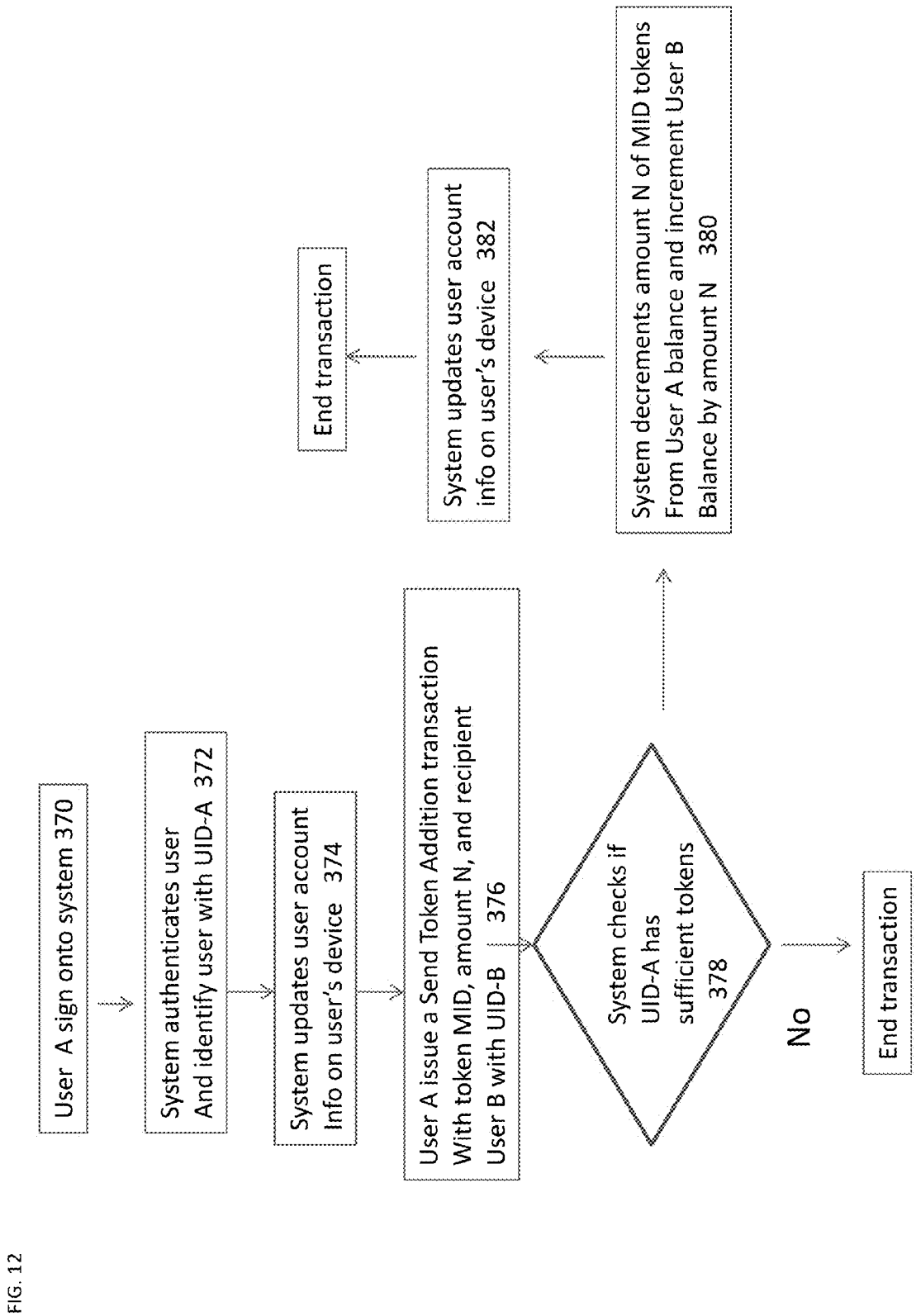
FIG. 12 shows an exemplary process to send a token to another user.

FIG. 12 shows an exemplary process to send a token to another user. In this process, a user logs into the system (370). The system authenticates and identifies the user with the UID-A (372). The system updates the user account information on the user's device (374). Next, the user issues a send token transaction with token MID, amount N, and a recipient user B with UID-B (376). The system checks if UID-A has sufficient tokens (378) and if not exits. Otherwise the system decrements the amount N of MID tokens from the user UID-A balance and increments the balance of User UID-B by the amount N (380). The system then updates the user account information on the user's device (382) and exits.

Figure 14:
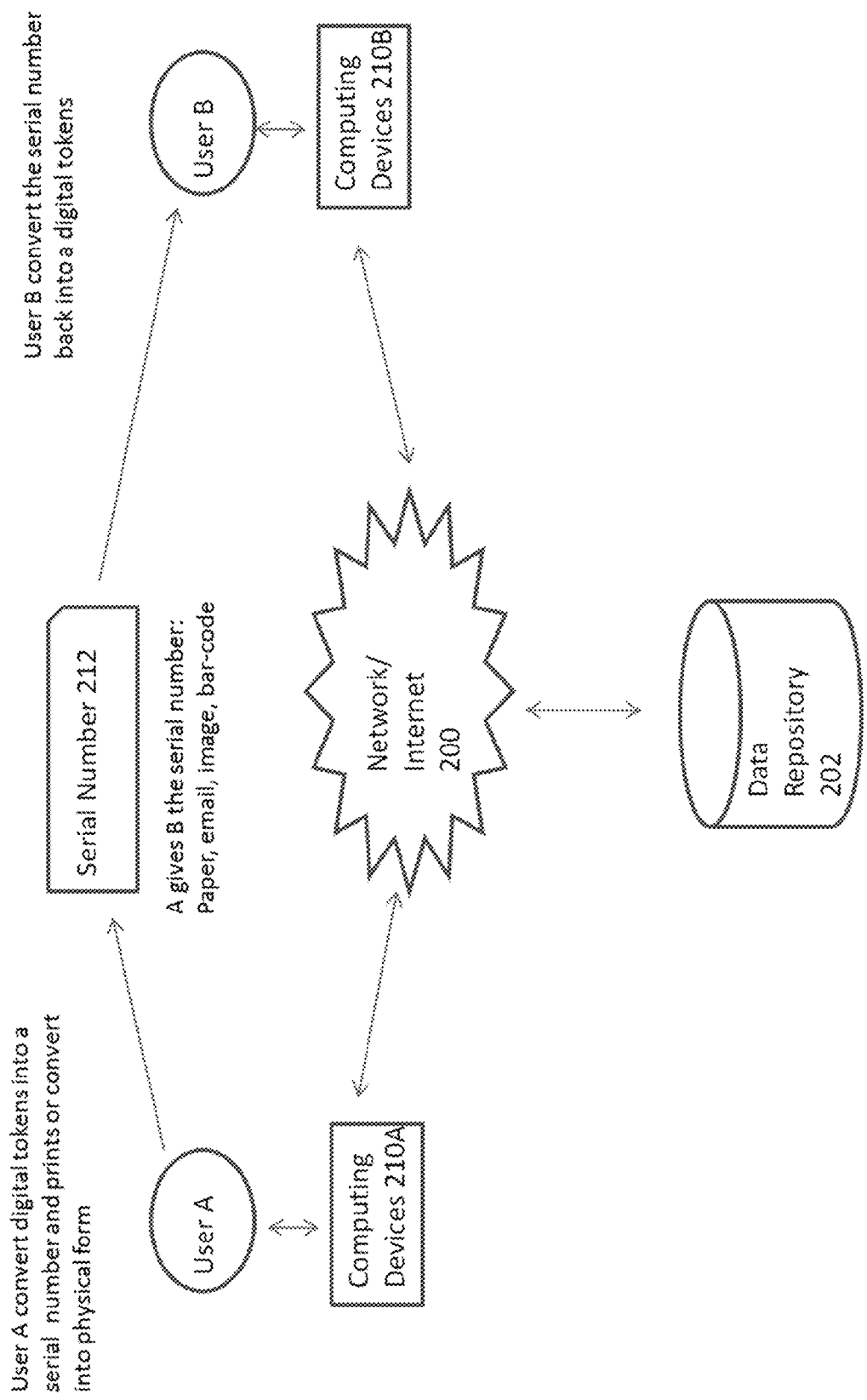
FIG. 14 shows an exemplary transmission of the serial number for use.
Figure 15:
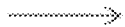
FIG. 15 shows the reverse process for FIG. 13, namely a conversion from the serial number back to a digital token.

FIG. 13 shows an exemplary process for converting from a digital token to a serial number. In this example, user 8204 converts 100 tokens with MID 1018 into a serial number with 100 tokens. FIG. 14 shows an exemplary transmission of the serial number for use. User A UID-8204 prints the serial number 212, or other physical forms and give or sell the serial to User B UID-9205. User A can transfer the serial number over the internet 200 from device 210A to device 210B in this example. FIG. 15 shows the reverse process for FIG. 13, namely a conversion from the serial number back to a digital token. In the conversion from serial number back to digital token, the balance table is updated with information reflecting that user 9205 converted 100 mid-1018 tokens into a serial number. The serial number table is also updated as shown therein.

The serial number can be expressed in a human readable form. The human readable form includes printed characters. The serial number can also be expressed in a machine readable form. The machine readable form includes a one-dimensional or two-dimensional bar or mark code. The code includes a QR code. The representation of value includes a secret. The representation of value includes a private key of a public key and private key pair. The public key (a) can be provided by a paid party to a paying party in connection with a transaction and (b) can form the basis of an address in a digital currency network to which the paying party can assign units of value for use by the paid party. The representation of value includes fifty-one ASCII encoded characters representing a base encoding of a private key part of a key pair associated with a Bitcoin-type network. The secrecy of the secret is preserved in the transaction. An anti-counterfeiting feature is provided, such as an anti-counterfeiting hologram. The apparatus of claim including a visible and human readable representation of a public key associated with the representation of value. The representation of value is cryptographically protected. The digital domain includes an online digital currency network. The digital currency network includes Bitcoin™. The security feature includes a visible element of the physical device. The security feature includes an element that visually obscures the representation of value. The security feature includes a packaging element of the physical device. The security feature includes a holographic foil. The change of state indicating that the value has been compromised includes a visible tampering.

The serial number can carry value and can be physically delivered in a transaction by imparting to the serial number to a physical device such as a paper a representation of value that is usable to transfer the value from the physical device to a digital domain. A security feature is imparted to the physical device that can change from a state indicating that the value carried by the physical device has not been compromised to a state indicating that the value carried by the physical device may have been compromised. The change in state is detectable. The representation of the value imparted to the physical device is inaccessible except in a manner that causes the security feature to change state.

Figure 16:
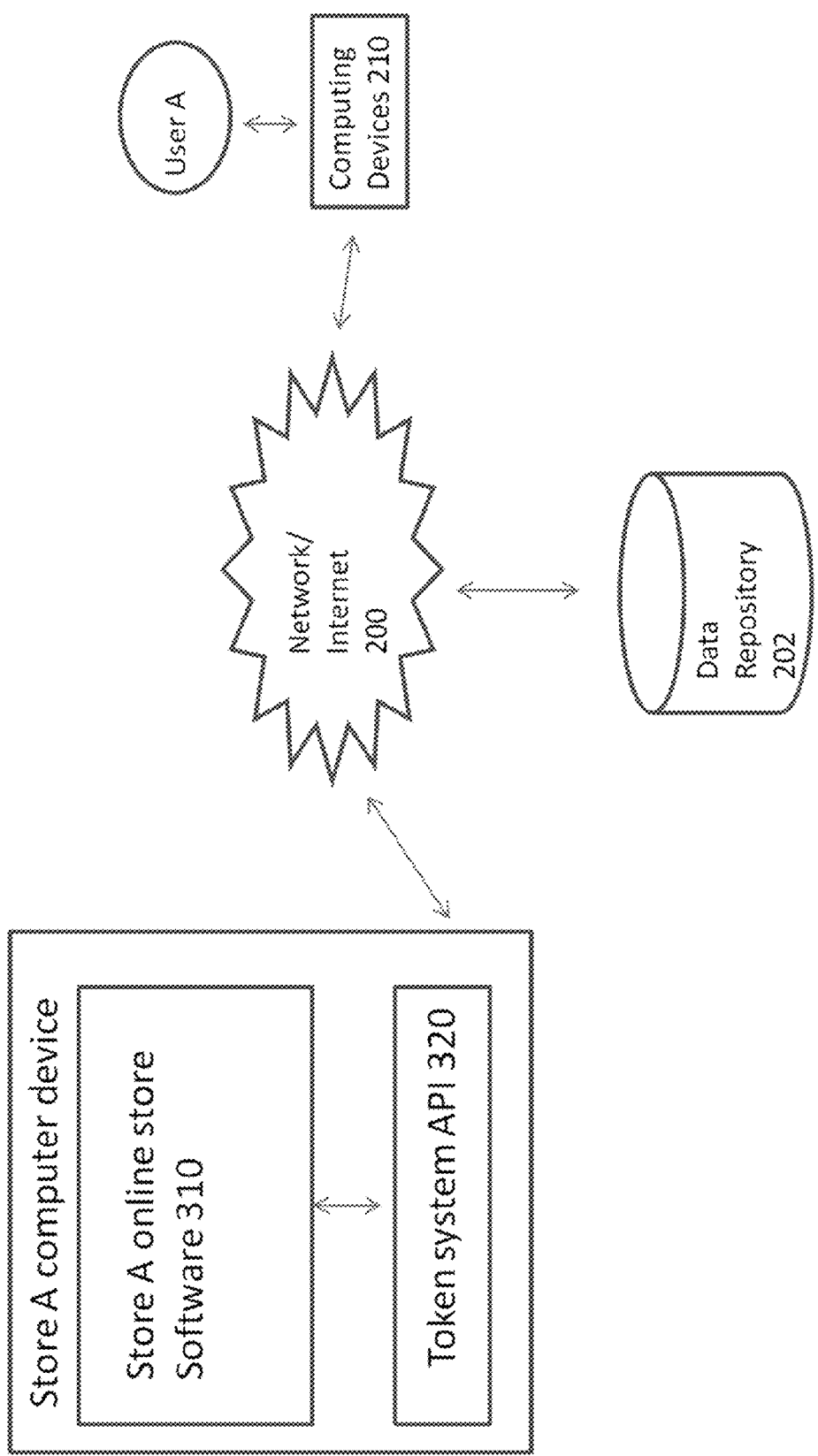
FIG. 16 shows an exemplary architecture of the online purchase.

Next, an exemplary usage scenario is discussed where prepaid digital tokens are used at a store front. In this example:
    Store A creates 100,000 "A dollar" tokens
    Store A sales 100 "A Dollar" to Customer B for $90 with
        promise note "each token is worth $1 at Store A"
        B gives A $90 and B's UID
        A sends 100 "A Dollar" to B
        B confirms the transaction from his account and leaves store
    Customer B buys $10 merchandise from store A
        Customer B sends store A 10 "A Dollar"
        Store A confirms the transaction from Store A's account
        Customer B leaves store with merchandise Next, an exemplary on-line purchase of physical goods is detailed. In this example:
    Online Store A sales 100 "A Dollar" tokens with a promise note "Each token worth $1 at Store A" to customer B via a web site using a credit card for $90
        Customer B enters his credit card number UID into Store A online store
        Store A charges the credit card $90 and sends Customer B 100 "A Dollar" tokens
    Customer A purchase $10 merchandise from online Store A with 10 "A Dollar" tokens
        Scenario A
            Customer A makes purchase on online Store A website
            Store A website request UID from Customer A
            Customer A enters his UID on Store A web site for the purchase
            Customer A sends Store A 10 "A Dollar" tokens
            Store A confirms the transaction and completes the purchase process In the following example, on line purchase of media is discussed as follows:
    Online Store A sales 100 "A Dollar" tokens with a promise note "Each token worth 1 cent at Store A, B and C" to customer X via a web site using a credit card for $1
        Customer B enters his credit card number UID into Store A online store
        Store A charges the credit card $1 and sends Customer B 100 "A Dollar" tokens
    Customer X purchase a 2 cents video from online Store B with 2 "A Dollar" tokens Customer X makes purchase on online Store B website Store B website request UID from Customer X Customer X enters his UID on Store B web site for the purchase Customer X sends Store B 2 "A Dollar" tokens Store B confirms the transaction and completes the purchase process Store B delivers video to Customer X Store B sales tokens back to Store A for dollars FIG. 16 shows an exemplary architecture of the online purchase. In this system, Store A runs a computer with an on-line software 310. Software 310 communicates with a token system API 320 that communicates over the internet 200 with data repository 202 and computing device 210 of the customer or user A.

FIG. 17 shows an exemplary token creation table. FIG. 18 shows an exemplary user table. FIG. 19 shows an exemplary ledger table. FIG. 20 shows an exemplary address book table, while FIG. 21 shows an exemplary balance table showing the amount of tokens available for each user id UID and token type MID.

Tokens with different MID identifiers can be exchanged based on mutual agreement of the owners. Users may associate tokens with real world currencies. Alternatively, users may associate tokens with real world commodities. Alternatively, users may associate tokens with objects of specific value. Representations include but are not limited to the following:

1. intra-family rewards
2. intra-school barter commodities
3. intra-institution currency
4. between business/corporation and consumer Users may use tokens as part of an authentication system of real world commodities. The authentication system may or may not involve conversion of tokens into physical format such as paper certificate.

For example, users may associate tokens with environmental or "green" credits. In one method of implementation in environmental conservation a government/institution issues a finite quantity of carbon footprint tokens to each individual and corporation. The amount of tokens issued can be based on the results of an environmental study. After these tokens have been distributed to the public, they can be exchanged or transacted—with certain limitations such as geographical constraints—among individuals and corporations without any aggregate change to environmental impact. In a related method "green" tokens are required, in addition to conventional currencies, in the transaction or purchase of gasoline and/or other commodities deemed to have a negative environmental impact. Representations of credits may include but are not limited to the following:

1. carbon dioxide, carbon monoxide emissions and pollutants related to commercial fuels
2. Incinerator and waste treatment emissions
3. hazardous chemicals
4. non-biodegradable wares and packaging materials
5. nuclear fuels
6. ozone depletion materials In another exemplary application, users may associate tokens with the right to use, consume or access certain natural resources of limited quantity or supply. Representations may include but are not limited to the following:

1. Fresh water
2. Trees
3. Wildlife
4. Vegetation to feed livestock
5. Minerals

In another exemplary application, users may associate tokens with certain commercial credits. Representations include but are not limited to the following:

1. Store credits, prepaid credits, personal credits, frequent buyer reward credits
2. Goodwill credits used by parents to reward their children, by teachers to reward students, employers to reward employees, goodwill credits between individuals or groups.
3. Resource such as meeting room time, use of public space, use of private space.
4. Voting rights for individuals or groups, private or public.
5. Shares of corporation or public business entities.

The supply of tokens is regulated by software and by the creator of the token and cannot be manipulated by any government, bank, organization or individual.

In one embodiment, the token contains secret data such as any secret information for which knowledge of the information may at some time be deemed of value by a third party. For example, the information may allow anyone who knows it to take ownership of corresponding digital currency on a digital currency network (or other online value exchange system or other digital domain). The type, quantity, expression, and other specifics of the secret data could vary depending on the protocol of the digital currency network for which the token is intended to store value. For example, if the secret data to be stored is a private key on the Bitcoin network, then the secret data may consist of 51 ASCII encoded characters representing a base 58 encoding of the private key part of a key pair. It is presumed that the digital currency network's protocol is arranged to be able to vest each owner of units of the digital currency with an instance or instances of unique secret data that may be used to assert ownership of and to engage in transactions using currency owned by the user. In this sense and in this example, ownership of units of digital currency in the network may be defined by ownership of the corresponding controlling secret data.

In some implementations, a digital currency network (or other online value exchange system or other digital domain) may utilize a public key cryptography scheme as an addressing system. In such a scenario, a user of the network (the term "user" broadly includes, for example, a person and any software or services used by or operated on behalf of the person, among others) will receive a public key and private key cryptographic key pair either by generating such a key pair in accordance with a protocol of the digital currency network or by receiving one from another node on the network. The public key part of the key pair, or some derivative of the public key such as its hash, can function, within the network, as an address (or an address can be constituted or derived from it) that a user may share with another party as a first step in conducting a transaction (not shown) in which the other party is going to deliver digital currency to the user. The location that is addressed serves as an account in the record-keeping system of the network to which the other party may assign units of currency for later use by the user. If, at a later time, the user who has received the units of digital currency wishes to send that currency to another user, the first user would then use the private key associated with the public key (from which the address was constituted or derived) to conduct a new transaction transferring the units received at that address in the former transaction to the new recipient user in the new transaction. For example, the network may require that the currency-sending user cryptographically sign the new transaction by encrypting a hash of the transaction message with the user's corresponding private key. This process can be repeated for use of the value in successive transactions in a chain from user to user. After a unit of currency has been used in several transactions, the record-keeping system of the network may juxtapose all those transactions in which the unit was transacted to show the unit's chain-of-ownership, in which each link (a transaction) includes an address and a cryptographic signature of that address generated using the private key corresponding to the address in the previous link. The present owner of the unit of currency is the possessor of the private key corresponding to the last address in this chain. In such a digital currency network based on a public key cryptography scheme, it is an instance of this private key that would be obtained for containment in a token or other physical device.

In some implementations, the digital currency network may be a peer-to-peer network of the kind proposed in a white paper published May 24, 2009, under the name Satoshi Nakamoto, commonly known as "Bitcoin". This network utilizes a private key and public key cryptography scheme as an addressing system. Users generate key pairs on a local computer in accordance with the Eliptic Curve Digital Signature Algorithm (ECDSA). Addresses are derived from the RIPEMD-160 hash of the public key. Transaction messages on the Bitcoin network include, among others, the address of the recipient user and the cryptographic signature of the sending user. The signature is to be generated using the private key corresponding to a public key at whose derivative address the currency-sending user had previously received units of currency. In some implementations of the Bitcoin example, it is an instance of such a private key that would be obtained for inclusion in the token or other physical device. Thus, the secret data (or other representation of value) may be extracted or derived by the creator of the token from data of the kind that is generated and received during the course of regular usage of any digital currency network. In implementations that use the Bitcoin network, the user or creator may use the network to generate a new key pair in accordance with the ECDSA standard. The creator may take the private key of the key pair as the secret data. The secret data may, but need not, allow access to some amount of digital currency at the time of manufacture (in which case the creator would send currency to the address corresponding to the newly generated key pair after generating the key pair but before manufacturing a token using that key pair). In any case, the secret data may be expressly made valuable (by such a deposit, for example) by the creator or another party at a later time. For example, the creator could conduct a transaction 406 on the digital currency network transferring units of digital currency to an address that may only be accessed using private key data stored within a physical token manufactured at a previous time. Measures should be taken to ensure that the secret data remains unknown to some or all parties other than the creator. In the case of a digital currency network, such measures may include offline key pair generation on a secure computer and destruction of any records of a private key following manufacture of a physical token. In the example of a creator obtaining as the secret data to be contained in the token a private key from the Bitcoin digital currency network, the creator may begin by obtaining the source code of the reference implementation of the Bitcoin client software. The standard Bitcoin client software running on the creator's computer will already include the capability to generate key pairs in compliance with the Bitcoin protocol; however the generated key pairs may not be in a suitable form for extraction, for example, of the private keys for containment in the physical token. Therefore, the creator may choose to modify the source code to allow the client software to export key pairs in a suitable form. For example, the creator may alter the client software to allow it to export key pairs in the form of an ASCII-encoded digital text file, containing public and private key numbers encoded in a base scheme. After obtaining the secret data, the creator encodes and stores it on a physical medium to be included as part of the token. A wide variety of methods can be used for physically encoding digital information, many of which may be suitable for encoding the creator's secret data. In some implementations, physical encoding involves using volatile or non-volatile flash memory chips, which can be programmed in such a way as to output the secret data at a later time. In some implementations, encoding involves storing the data magnetically on magnetic tape or a "magstripe", which may be read using a special reader to reveal the secret data. In some implementations, the data may be encoded as alphabetic or numerical characters printed onto paper, which may be read by an unassisted human. In some implementations, the data may be encoded as small physical features etched into a substrate, to be read by optical or other means. In some implementations, the data may also be encoded as a series of glyphs printed on paper or another substrate in one or two dimensions to be read by an imaging device, for example a barcode. In such implementations, the glyphs could be generated using any of a number of standards, such as the QR Code standard originally designed by Denso Wave Inc. The creator may choose one or more of these or of the numerous other encoding methods for use in containing the secret data on a physical medium for inclusion in the token. A combination of any two or more techniques can be used for physically encoding the secret data in a single token.

In implementations that encode the secret data using the QR Code standard, the creator may use computer software that takes as an input the secret data obtained by the creator and, subject to parameters such as error correction level and QR code size, generates an image file of a standards-compliant QR code.

In various implementations, the creator can form, shape, mold, cut, or machine (or a combination of any two or more of them) the material into the approximate shape and size of the final token, or into a shape and size desirable for manufacturing the token or multiple tokens out of the material. The creator may then proceed through a number of further processing stages to alter the appearance and/or properties of the material. The creator may print, stamp, and/or affix functional or decorative elements to the material. The creator may print a decorative design and/or brand onto the material, and may print onto the token the amount of value to be stored within the token to indicate the token's "denomination".

The creator may process the material in such a way as to provide security features for the final token. One class of security features that the creator may add to the token is anti-counterfeiting, for example, features that make it difficult or impossible for parties other than the creator to produce a token that may be misidentified as having been produced by the creator. Such anti-counterfeiting features may include, but are not limited to: watermarks, microprinting, security holograms, serial numbers, heat-sensitive or color shifting inks and dyes, finely featured designs and patterns, hidden and UV sensitive printing, and security threads and fibers, and any combination of two or more of those features and others.

In implementations in which the creator chooses to affix a security hologram to the token, the hologram may be in the form of a sticker comprised of foil with adhesive backing onto which the hologram has been printed, to be applied to the token. In some implementations, the hologram may be printed onto foil that the creator may hot stamp onto the token substrate. It is possible for the creator to use the physically encoded data itself as part or all of the token's body, and apply one or more of the above manufacturing steps to the physically encoded data. In such implementations, there may be no need for a separate processing step to embed the physically encoded data into a token body.

If the secret data to be stored within the token is (or is based on) a cryptographic private key, the creator may choose to print the corresponding public key, or a derivative such as its RIPEMD-160 hash, onto the material so that it is visible to anyone who has possession of the token. In the case that the secret data to be embedded in the token is a private key that can be used to claim currency on the Bitcoin ecurrency network, the creator may print onto the face of the material the Bitcoin address that corresponds to the private key to be stored within the token. This may be useful to the user by allowing her to verify that the data in the token remains valuable by checking the balance held at the printed Bitcoin address. It may also be useful for when the user chooses to redeem her token by accessing its secret data. Similarly, instructions for redeeming the token 616 may be printed onto the token substrate.

The denomination that the creator prints onto the substrate may be the number of Bitcoins that have been transacted to the Bitcoin address corresponding to the secret private key that will be embedded within the token. The creator may adhere one or more secure holographic stickers or foils to one or both sides of the printed token(s). The hologram may be such that attempted removal or tampering causes the hologram to be destroyed irreparably.

The token system hardware may consist of a central server connected to many client devices. All activities may occur within the central server and client devices. All activities may also occur within the central server exclusively. Alternatively, the token system hardware may also consist of many devices connected together in a peer to peer fashion without a central server. In this case all activities occur between client devices. A client device may be a mobile phone, smart phone, PDA, tablet computer, laptop computer, or any processing or computing device. The central server may host a database as central repository. The connection method among client devices and central server may include internet, phone, Bluetooth wireless, and Ethernet local connection.

It will be apparent to one of ordinary skill in the relevant arts that although the electronic tokens described herein may be of a single denomination, multiple denominations of electronic tokens could be provided. For example, a vendor may offer "silver" tokens, having a unit value, and "gold" tokens, having a value of ten "silver" tokens. The vendor may optionally price the various denominations of electronic tokens however he chooses. For instance, in the example given above, the "silver" tokens may be priced at ten cents each, while the "gold" tokens are priced at ninety-five cents each, giving the user a discount for purchasing "gold" tokens.

What is claimed is:

1. A method for providing data services from a service platform to one or more registered end users via one or more networked computing devices, the method comprising:

receiving at a computer a request from any user to create one or more unique tokens, in response creating only at a creator account a new token type by adding a new entry in a token creation and an owner table associating a user id (UID), a new token type (MID) and the number of tokens created;

only allowing the creator of the token type MID to increase the number of tokens with the same token-type by changing a number-of-tokens-created entry in the token creation and owner table, wherein newly created tokens are owned by the creator and added to the balance table with MID, UID and balance;

authenticating a non-creator user with the UID and receiving with the UID a create transaction with a token name, amount and a manifesto; and generating a globally unique MID for the create transaction and executing the transaction by updating the balance table to decrement the balance from a sender and increment the balance to a receiver and keeping constant the total number of tokens in the balance table before and after the transaction.

2. The method of claim 1, wherein the supply of tokens is controlled only by the creator of the token.

3. The method of claim 1, wherein after creation, tokens are indestructible.

4. The method of claim 1, wherein each user is uniquely identified by the UID.

5. The method of claim 1, wherein the user receives tokens from another user, accepts or rejects an offer of tokens from another user, requests tokens from another user, and honors or rejects request of tokens from another user.

6. The method of claim 1, wherein tokens in a digital form are instantiated into a physical form, comprising converting a physical form of tokens into a digital form.

7. The method of claim 6, wherein tokens in physical form have associated constraining attributes including (a) predetermined users who can make a claim, or (b) expiration attributes based on date, claiming, number of transaction, users and geography.

8. The method of claim 1, comprising enabling each of the plurality of users to create his or her own secure supply of unduplicatable digital tokens to allow each user to issue one or more private values or currencies.

9. A digital token system using a client server system where:

a centralized computer acting as a central synchronization point for all transactions among the different devices; and computer readable code for a user to create unique tokens, wherein a user who created the token ("creator") is the only user authorized to increase the quantity of tokens of the same token-type, wherein the outstanding number of token is visible to everyone, wherein a user creates a new token type by adding a new entry in a token creation and an owner table associating a user id (UID), a new token type (MID) and the number of tokens created and only allowing the creator of the token type MID to increase the number of tokens created by changing a number-of-tokens-created entry in the token creation and owner table, wherein newly created tokens are owned by the creator and added to the balance table with MID, UID and balance; authenticating a non-creator user with the UID and receiving with the UID a create transaction with a token name, amount and a manifesto; and generating a globally unique MID for the create transaction and executing the transaction by updating the balance table to decrement the balance from a sender and increment the balance to a receiver and keeping constant the total number of tokens in the balance table before and after the transaction.

10. A system for providing data services from a service platform to one or more registered end user entities via one or more networked computing devices, the system comprising: memory; a communications interface operably coupled to the memory; and at least one processor operably coupled to the memory and the communications interface, wherein a plurality of computers each acting as a local synchronization point for all transactions among different devices; the system comprising:

computer readable code on each computer to allow a user to create unique tokens, wherein a user who created the token ("creator") is the only user authorized to increase the quantity of tokens of the same token-type, wherein the outstanding number of token is visible to everyone, wherein a user creates a new token type by adding a new entry in a token creation and an owner table associating a user id (UID), a new token type (MID) and the number of tokens created and only allowing the creator of the token type MID to increase the number of tokens created by changing a number-of-tokens-created entry in the token creation and owner table, wherein newly created tokens are owned by the creator and added to the balance table with MID, UID and balance; authenticating a non-creator user with the UID and receiving with the UID a create transaction with a token name, amount and a manifesto; and generating a globally unique MID for the create transaction and executing the transaction by updating the balance table to decrement the balance from a sender and increment the balance to a receiver and keeping constant the total number of tokens in the balance table before and after the transaction.

11. The system of claim 10, wherein a sending user converts a digital token into a serial and communicates the serial to a recipient user.

12. The system of claim 10, wherein a recipient user receives a serial and converts the serial into the digital token and exchanging the received digital token for a predetermined value.

13. The system of claim 10, comprising code for enabling each of the plurality of users to create his or her own secure supply of unduplicatable digital tokens to allow each user to issue one or more private values or currencies.

14. The system of claim 10, wherein tokens in a digital form are instantiated into a physical form, comprising converting a physical form of tokens into a digital form and wherein tokens in physical form have associated constraining attributes including predetermined users who can make a claim, and expiration attributes based on date, claiming, number of transaction, users and geography.

15. The system of claim 10, wherein the token contains secret data such as any secret information for which knowledge of the information and the secret information includes 51 encoded characters representing a base 58 encoding of the private key part of a key pair.

16. The system of claim 10, comprising a protocol to vest each owner of units of the digital currency with an instance or instances of unique secret data to assert ownership of and to engage in transactions using currency owned by the user.

17. The system of claim 10, wherein the token comprises a digital currency network with public key cryptography as an addressing system and a public key part of a key pair, functions as an address for a location serving as an account in a record-keeping system of the network to which the other party may assign units of currency.

* * * * *

UNITED STATES PATENT AND TRADEMARK OFFICE
CERTIFICATE OF CORRECTION

PATENT NO. : 9,818,109 B2
APPLICATION NO. : 13/966216
DATED : November 14, 2017
INVENTOR(S) : Danny Loh It is certified that error appears in the above-identified patent and that said Letters Patent is hereby corrected as shown below:

On the Title Page

Item (73) under Assignee, delete "Danny Loh, Palo Alto, CA (US); Bao Tran, Palo Alto, CA (US)".

Signed and Sealed this
Seventh Day of February, 2023

Katherine Kelly Vidal
*Director of the United States Patent and Trademark Office*